Nov. 10, 1953      S. D. RUSSELL      2,658,323
BALER CONVEYING AND FEEDING MEANS
Original Filed April 19, 1941      3 Sheets-Sheet 2
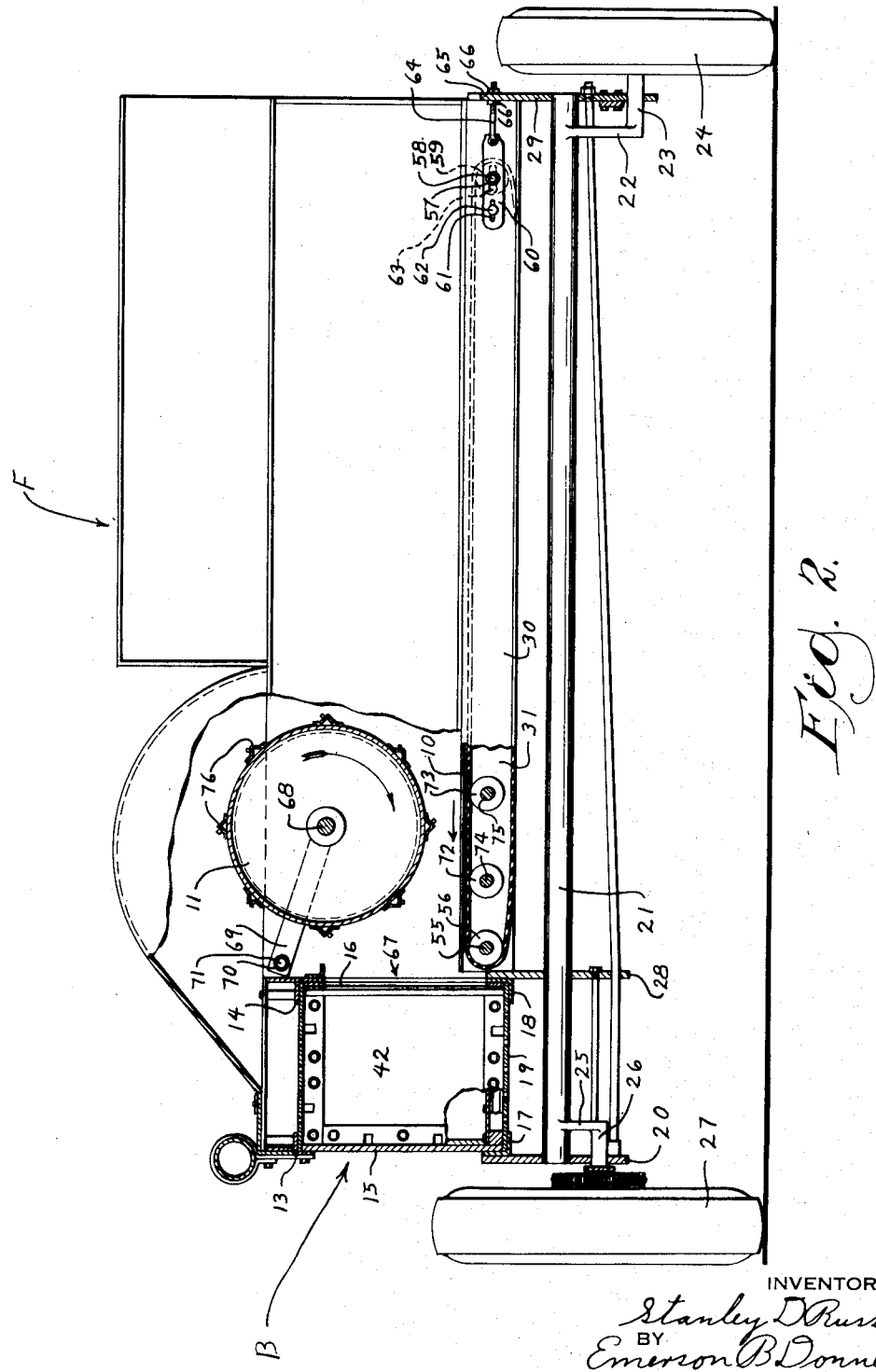
INVENTOR
Stanley D Russell
BY Emerson B Donnell
ATTORNEY.

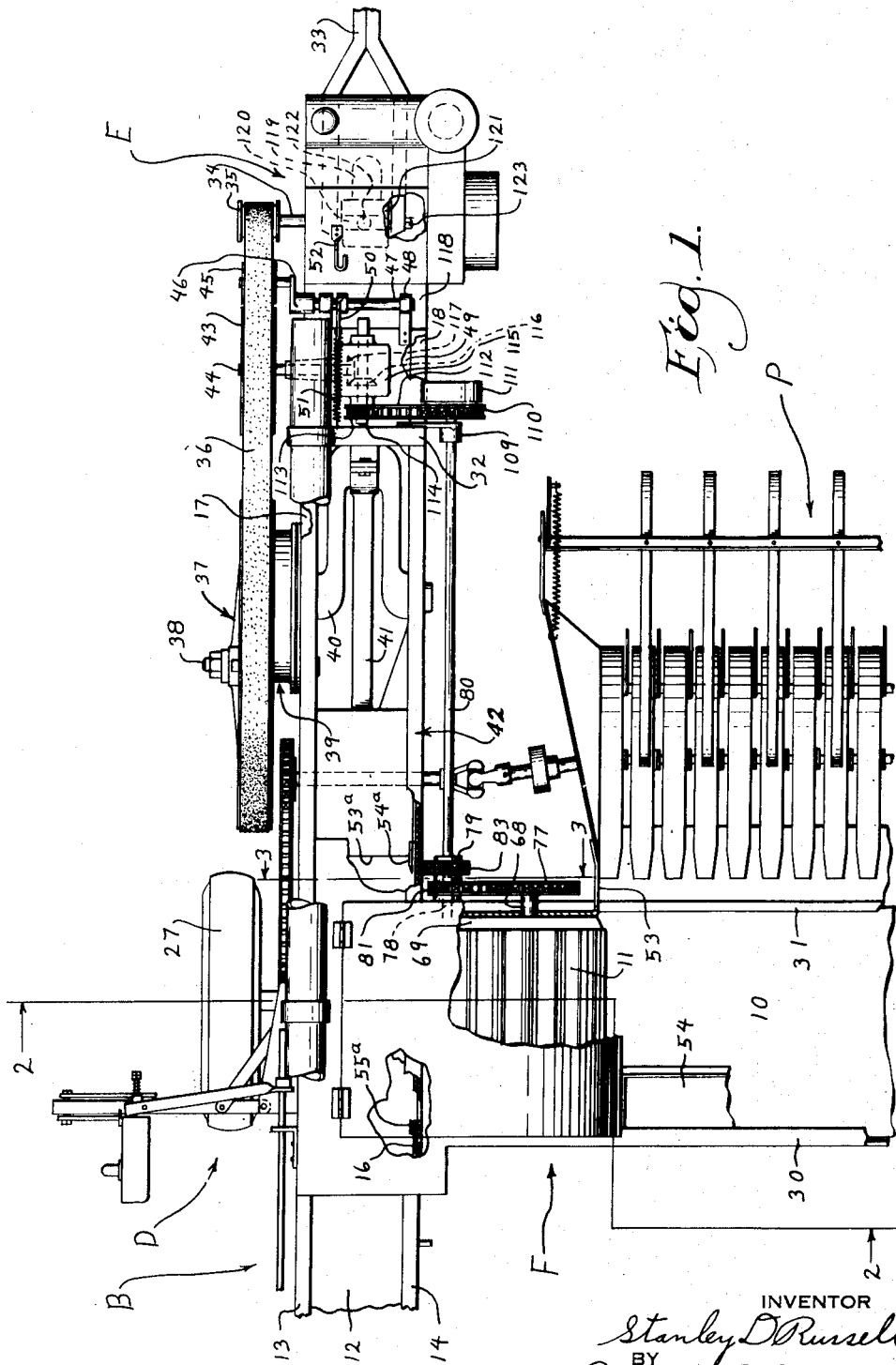

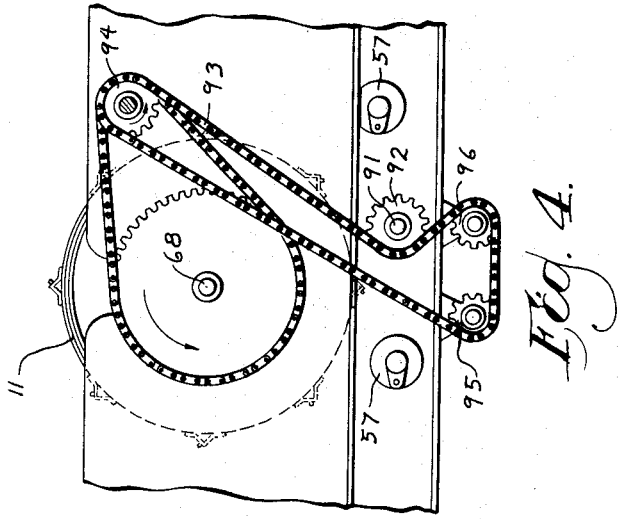
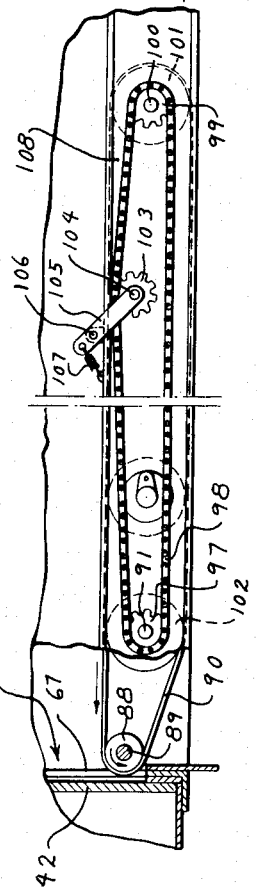
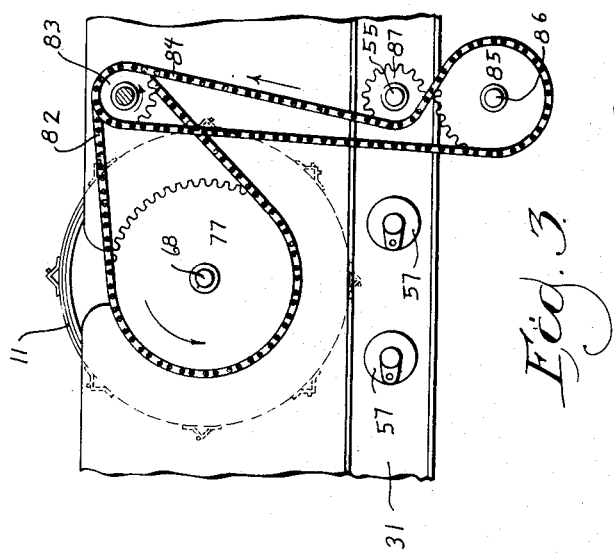

Patented Nov. 10, 1953

2,658,323

UNITED STATES PATENT OFFICE 2,658,323

BALER CONVEYING AND FEEDING MEANS

Stanley D. Russell, Racine, Wis., assignor to J. I. Case Company, Racine, Wis., a corporation Original application April 19, 1941, Serial No. 389,396, now Patent No. 2,362,861, dated November 14, 1944. Divided and this application November 11, 1944, Serial No. 563,038

6 Claims. (Cl. 56—341)

The present invention relates to balers and an object thereof is to generally improve the construction and operation of machines of this class.

A further object is to provide such a machine of larger capacity, lighter weight and lower cost than similar machines of comparable dimensions heretofore known.

A further object is to provide improvements in apparatus for feeding a baler.

Further objects will become apparent from the following description and accompanying drawings in which Figure 1 is a plan view with parts removed and others broken away of an illustrative machine embodying the invention.

Fig. 2 is a vertical sectional view on the line 2—2 of Fig. 1.

Fig. 3 is a vertical sectional view on the line 3—3 of Fig. 1.

Fig. 4 is a similar view of a modified arrangement of driving mechanism.

Fig. 5 is a view of a portion of Fig. 2 showing a modified arrangement of driving mechanism corresponding with that shown in Fig. 4.

Similar reference characters have been applied to the same parts throughout these drawings and the specification.

The present illustrative machine is similar to that disclosed in the co-pending application of Stanley D. Russell, Serial No. 389,396, filed April 19, 1941, and patented November 14, 1944, No. 2,362,861, of which this application is a division.

As seen in Fig. 1, the illustrative machine includes a baler generally designated as B, a pickup generally designated as P, feeding means F and bale dividing means D, the mechanism being driven, if desired, by an engine E. Pickup P operates to elevate material from the ground onto a rubber or other smooth, friction surfaced apron 10 which conveys the material toward baler B and beneath a rotating drum, roller or feeder 11. Apron 10 and feeder 11 urge the material into the baling chamber through an opening in the side thereof. The dividing means D operate periodically to provide a pathway for a wire or other binding means and without interruption of the feeding by apron 10 and drum 11.

As seen in Figs. 1 and 2, the main body of the baler comprises a baling chamber made up in any suitable or well-known manner, having for example a top plate 12 connected as by angle irons 13 and 14 with side plates 15 and 16, plates 15 and 16 being connected in the present instance by angle irons 17 and 18 with a bottom plate 19. These members make up a box-like structure constituting the baling chamber or compressing chamber of the baler. Angle iron 17 is supported by means of a bracket or attaching means 20 fixed therewith and engaging an axle or brace 21 extending transversely beneath bale chamber B and feeder F. Axle 21 has a downwardly extending bracket 22 carried by a stub axle 23 which is in turn supported by a ground engaging wheel 24. Axle 21 adjacent its other end has a bracket 25 carried by a stub axle 26 which is in turn supported by a ground engaging wheel 27. A bracket or attaching means 28 which may be somewhat similar to above mentioned bracket 20 extends downwardly from angle iron 18 and is supported on axle 21. A bracket or attaching means 29 engages axle 21 in the vicinity of bracket 22 and supports Z bars 30 and 31 constituting a frame structure for feeding platform or mechanism F, Z bars 30 and 31 extending substantially between brackets 28 and 29 to be supported thereon.

Returning to baling chamber B, angle irons 13, 14, 17 and 18 extend the full length of the baling chamber and beyond to form the major portion of the machine, in the present instance being united by a frame, bulkhead or the like 32, at the front of the baling chamber. In the neighborhood of bulkhead 32, engine E is supported on the frame by connection with angle irons 17 and 18.

The structure so far described comprises a unitary vehicle which can be readily trailed behind or partially supported on a tractor or other pulling means not shown, for example by means of a draw bar 33.

The baling mechanism proper is carried on or associated with baling chamber or body portion B. Engine E has a crank or driving shaft 34 and a driving pulley 35, the details of engines generally being well-known and forming no part of the present invention, the engine will not be further described.

Pulley 35 drives through a belt or a flexible motion transmitting means 36, a flywheel generally designated as 37 fixed on a shaft 38 driving through a reduction gear generally designated as 39, a crank 40 actuating a pitman 41 which drives a baling plunger 42 in a manner fully disclosed in the above mentioned pending application. Belt 36 as well as engaging pulley 35 also engages an idler pulley 43 fixed on a countershaft 44, the belt being maintained in contact with idler 43 as by a belt tightening idler 45. Idler 45 is supported as by an arm 46 fixed on a shaft 47 carried in suitable bearings as 48, supported on a reinforcing plate 49 carried by angle irons 17 and 18. Shaft 47 has a lever 50 urged rearwardly by a spring 51 for rotating shaft 47 in a counterclockwise direction as viewed from the right side of the machine. This yieldably presses idler 45 into contact with belt 36. When it is desired to temporarily disconnect the mechanism from engine E, lever 50 may be pulled forwardly which will lower idler 46 and loosen belt 36. A hook or other suitable fastening means 52 may be provided for holding lever 50 in this position.

Pitman 41 actuates a plunger generally designated as 42 including a head or end wall 53a which engages the material to be compressed. At the margin of wall 53a nearest to apron 10, and drum 11, a knife or cutting means 54a is suitably mounted on the plunger. Side plate 16 has an abutment or slice bar 55a, and knife 54a which, in the rearward passage of plunger 42, passes somewhat to the rear of bar 55a so as to positively cut off the stream of material from feeding mechanism F.

Feeding mechanism F cooperates with pickup P and has a guard sheet 53 and a back sheet 54 for preventing passage of material across the feeder and over the back thereof, and also for preventing access of wind to material being baled. Back sheet 54 may be inclined forwardly if desired.

Z bars 30 and 31 together with brackets 28 and 29 constitute a rectangular framework for carrying a series of rolls for supporting and actuating above mentioned apron 10. This is seen in Fig. 2. Z bar 30 supports a shaft 55 on which is mounted a roller 56, suitable bearings as 57, Fig. 3, of well-known type being carried by Z bars 30 and 31 and supporting shaft 55 as fully set forth in the above identified application. Similar bearings support a shaft 58 on which is mounted a roller 59. Above mentioned apron 10 is trained about rollers 56 and 59 and may be of any suitable or well-known type, in the present instance constituting a smooth, wide web of suitable material, such for example as rubber belting, although other suitable frictional material may be substituted within the contemplation of the invention. Roller 56 may advantageously have a knurled or roughened periphery and may be driven by mechanism as will appear to cause movement of apron 10 as indicated.

For maintaining the tension of apron 10, the bearings 57 for shaft 58 are carried on suitable supports as 60, it being necessary to describe only the one shown in Fig. 2 since it is typical. Support 60 has a slot 61 engaged by a bolt or the like 62 carried by Z bar 30 and bearing 57 is slidable in a slot 63 in Z bar 30, support 60 and bearing 57 being urged to the right by a bolt or the like 64 fixed with the support and extending through an ear 65 to which it is clamped as by nuts 66—66. By suitably adjusting nuts 66, shaft 58 and accordingly roller 59 may be moved in a direction to adjust the tension of apron 10. Since an identical support is associated with Z bar 31, roller 59 may be corrected in its relation to roller 56 to insure proper and accurate running of apron 10.

It will be apparent that material to be baled coming from pickup P, will be moved by apron 10 toward an opening 67 in plate 16. It will also be apparent that at such times as the opening is closed by plunger 42, apron 10 may continue to run and slip beneath material momentarily blocked in its movement by the plunger.

The feeding of material is further effected by above mentioned feed drum 11 which is fixed on a shaft 68 and rotates in the direction indicated so that its periphery travels in the same direction as apron 10 in the region where the drum is next to the apron. Shaft 68 is carried in suitable bearings which are supported on arms such as 69 fixed with a sleeve or the like 70 journaled on a member 71 carried by back sheet 30 and front sheet 31, constituting part of the feeder. Drum 11 may accordingly rise and fall about member 71 as an axis so that it may rest or "float" on material being baled. Drum 11 is of substantial weight and acts to preliminarily compact and compress the material into a ribbon-like mass which is urged by the travel of apron 10 and drum 11 directly into opening 67. This is very effective in getting a large volume of material through the opening in a given time, the volume of the usual loose fluffy material being reduced to a very small fraction of its original volume before passing through the opening. This is in contrast to the usual operation in which the material is still loose when it arrives at the feed opening and is stuffed down into the opening by a feeder head.

Drum 11 as above noted, floats on the material and is free to rise and fall as the volume increases or decreases during operation, the density of the preliminarily compressed material depending on the downward pressure of the drum which can be predetermined as desired.

The downward pressure of drum 11 is transmitted through the incoming material to apron 10 and, to assist apron 10 in resisting this pressure, supporting rollers 72 and 73 are supported beneath apron 10 in the region of the downward pressure of drum 26. Rollers 72 and 73 may be mounted on shafts 74 and 75 carried in bearing of any suitable or well-known type as above mentioned bearing 57.

Assuming drum 11 and apron 10 to be traveling as above noted in the directions indicated, a continuous stream of material will be preliminarily compressed and conveyed into bale chamber B through opening 67 as suggested in Fig. 2. Momentarily and periodically however, plunger 42 comes rearwardly toward the observer in Fig. 2 and blocks opening 67. Apron 10 and drum 11, however, continue to rotate and material continues to be urged through the compressing space between drum 11 and apron 10 and to pile up in a mass against plunger 42. A substantial volume of such material is momentarily compressed into a storage space to the left of drum 11 and apron 10 and to pile up in a mass against plunger 42. A substantial volume of such material is momentarily compressed into a storage space to the left of the drum 11 as seen in Fig. 2 and between it and plunger 42 during this brief interval. Drum 26 carries cleats 76—76 on its periphery for increasing its traction and minimizing slipping on the material being baled and if material is unable to move into baling chamber B, the cleats may exert a lifting effect on the material so as to raise the body forming between the drum 11 and plunger 42 to completely fill the substantially triangular space resulting between said drum and said plunger. If no room for further material is present, additional material forced in may tend to lift drum 26 to give more space between the drum and plunger, this action depending upon whether a sufficient volume of material is coming from pickup P. As is apparent, cleats 76—76 are comparatively low and give drum 11 what might be termed a slightly roughened periphery. It will be apparent that a relatively dense mass of material (which is usually fairly resilient) is built up against plunger 42 in anticipation of the clearing of opening 67. Accordingly, almost instantaneously upon the withdrawal of plunger 42, this body or slug of material passes through opening 67 into bale chamber B as fully set forth in the above identified pending application. This body of material being somewhat compact, is thought to retain its triangular shape to some extent and to aid in filling the top of the bale chamber.

Furthermore, if the volume of incoming material is sufficiently large, bale chamber B may fill completely full and the material built up additionally outside of opening 67 in a manner similar to what it does in the case where the opening is closed. In any event, a liberal supply of material to be baled is kept in readiness to enter bale chamber B at all times.

As above suggested, drum 11 may swing up and down about member 71. Drum 11 is rotated through above mentioned shaft 68 by means of a sprocket 77. Accordingly, it is convenient for the drive to sprocket 77 to originate on the center line of member 71. In the present instance, member 71 comprises a journal or pilot 78. A hub portion 79 fixed on a shaft 80 disposed lengthwise of the bale chamber is journaled on above mentioned pilot 78 and has a sprocket or the equivalent 81 engaging chain 82 for driving above mentioned sprocket 77, the hub portion also having a sprocket 83 engaging a chain 84 constituting a drive for apron 10. As seen in Fig. 3, chain 84 extends downwardly from sprocket 83 to an idler sprocket 85 rotatably supported on a shaft 86 below Z bar 31, the chain on its upward run engaging a sprocket 87 fixed with above mentioned shaft 55. Shaft 55 carrying roller 56, as above noted, causes rotation of roller 56 in the proper direction to drive apron 10.

A modified construction for driving apron 10 from the end remote from baling chamber B is indicated in Figs. 4 and 5. By this expedient the apron may be advanced for closely to opening 67 and in fact may project into the opening slightly thus resulting in more efficient feeding of material. Under these conditions, an idler roller 88 which may be substantially smaller in diameter than above mentioned roller 56 is mounted on a shaft 89 carried in suitable bearings such as 57 above described. Roller 88, however, because of its smaller size may be placed to extend somewhat into the feed opening as shown, it being so placed that only the minimum safe clearance exists between feed apron 90 and plunger 42. Under these conditions, it may be advisable to drive through one of the larger rollers and accordingly as shown in Fig. 4, a shaft 91 corresponding in position to above mentioned shaft 74 has a sprocket 92 fixed thereon similar to above mentioned sprocket 87, a chain 93 engaged with sprocket 94, corresponding to above mentioned sprocket 83, engaging sprocket 92 and idler sprockets 95 and 96, suitably supported beneath sprocket 92.

In this manner, rotation of sprocket 92 in a direction opposite to sprocket 94 is obtained in addition to accommodating the relatively offset position of sprocket 92. Shaft 91 leads entirely through the feeder as shown in Fig. 5 and carries a sprocket 97 driving, through a chain 98, a sprocket 99 fixed with a shaft 100 on which is mounted a roller 101 corresponding in position to above mentioned roller 59. Roller 101 may be knurled or otherwise roughened for more positive engagement with apron 90. Shaft 91 has a roller 102 corresponding in position to above mentioned roller 72. Although roller 102 does not have enough surface in contact with apron 90 to drive the latter, sprockets 92 and 97 and rollers 101 and 102 may be so chosen that the surface speeds of roller 102 and apron 90 are the same, so that although roller 102 is "alive" there is no slipping between it and apron 90 to damage the apron.

A sprocket 103 may be journaled on a stud or the like 104 carried by a lever 105 pivoted on a fulcrum 106 and urged in a counterclockwise direction by a spring 107, fulcrum 106 and spring 107 being supported from or by a Z bar 108 corresponding to above mentioned Z bar 30.

Above mentioned shaft 80, as seen in Fig. 1, extends through a bearing 109 supported by bale chamber B and carries a sprocket or the like 110, a safety release clutch 111 of well-known or suitable type being interposed, if desired. A chain 112 engages sprocket 110 and a sprocket 113 mounted on a shaft 114 journaled in a housing 115 and carrying a bevel gear 116 meshing with a bevel gear 117 on above mentioned shaft 44, shaft 44 as above indicated carrying idler 43 which is driven by belt 36. Accordingly, actuation of belt 36 by engine E causes driving of shaft 80, drum 11 and apron 10.

Angle irons 17 and 18 terminate in or are fastened to a platform 118 which serves as part of the main body of the machine and as a support for engine E. Platform 118, in the present instance, is supported by a ground engaging wheel 119 having an axle 120, and supporting the platform through a fork or similar member 121. Fork 121 preferably has a shank or king pin 122 journaled in suitable or well-known manner in platform 118, and above mentioned drawbar 33 is bifurcated or otherwise suitably arranged to be pivotally connected as at 123 with fork 121.

The above being a complete description of an illlustrative embodiment of the invention, what is claimed as new and desired to be secured by Letters Patent of the United States is:

1. In a feeding device for a pickup baler having a longitudinally disposed baling chamber providing a feed opening in one side thereof and a pickup drum rotatable on an axis transverse to the length of said baling chamber; the combination of a smooth, endless, friction surfaced apron leading transversely of said baling chamber toward said feed opening substantially normal to the plane thereof and disposed to receive material moving backwardly from said pickup drum, to change its direction and impel it crosswise of said direction toward said opening, supporting means pivoted adjacent to an upper edge of said baling chamber and extending outwardly therefrom, a drum element positioned above said apron and carried by said supporting means outwardly of the pivotal support of said supporting means, as related to said baling chamber for preliminarily compressing material carried by said apron between itself and said apron so as to tend to climb on said material when rotated, and means for rotating said drum element for urging material toward said feed opening concurrently with said apron, said drum element being supported above said apron so as to float on material traveling thereon.

2. In a feeing device for a pickup baler having a longitudinally disposed baling chamber providing a feed opening in one side thereof subject to being periodically blocked, and a pickup drum rotatable on an axis transverse to the length of said baling chamber; the combination of a smooth, endless, friction surfaced apron leading transversely of said baling chamber toward said feed opening substantially to the plane thereof and disposed to receive material moving backwardly from said pickup drum, to change its direction and impel it crosswise of said direction toward said opening, supporting means pivoted adjacent to an upper edge of said baling chamber and extending outwardly therefrom, a drum element positioned above said apron and carried by said supporting means outwarly of the pivotal support of said supporting means, as related to said baling chamber for preliminarily compressing material carried by said apron between itself and said apron so as to tend to climb on said material when rotated, and means for rotating said drum element for urging material toward said feed opening concurrently with said apron, said drum element being supported above said apron so as to float on material traveling thereon, and having a plurality of low cleats providing a slightly roughened surface engaging material to be impelled on said apron.

3. In a feeding device for a pickup baler having a longitudinally disposed baling chamber providing a feed opening in one side thereof subject to being periodically blocked, and a pickup drum rotatable on an axis transverse to the length of said baling chamber; the combination of an endless apron leading transversely of said baling chamber toward said feed opening substantially normal to the plane thereof and disposed to receive material moving backwardly from said pickup drum, to change its direction and impel it crosswise of said direction toward said opening, supporting means pivoted adjacent to an upper edge of said baling chamber and extending outwardly therefrom, a drum element positioned above said apron and carried by said supporting means outwardly of the pivotal support of said supporting means, as related to said baling chamber for preliminarily compressing material carried by said apron between itself and said apron so as to tend to climb on said material when rotated, said drum element being outwardly spaced from said baling chamber to provide a storage chamber for material during momentary blocking of said feed opening, and means for rotating said drum element for urging material toward said feed opening concurrently with said apron, said drum element being supported above said apron so as to float on material traveling thereon.

4. In a feeding device for a pickup baler having a longitudinally disposed baling chamber providing a feed opening in one side thereof and a pickup drum rotatable on an axis transverse to the length of said baling chamber; the combination of an endless apron leading transversely of said baling chamber toward said feed opening substantially normal to the plane thereof and disposed to receive material moving backwardly from said pickup drum, to change its direction and impel it crosswise of said direction toward said opening, supporting means pivoted adjacent to an upper edge of said baling chamber and extending outwardly therefrom, a drum element positioned above said apron and carried by said supporting means outwardly of the pivotal support of said supporting means, as related to said baling chamber for preliminarily compressing material carried by said apron between itself and said apron so as to tend to climb on said material when rotated, and means for rotating said drum element for urging material toward said feed opening concurrently with said apron, said drum element being supported above said apron so as to float on material traveling thereon.

5. In a feeding device for a pickup baler having a longitudinally disposed baling chamber providing a feed opening in one side thereof and a pickup drum rotatable on an axis transverse to the length of said baling chamber; the combination of an endless, friction surfaced apron leading transversely of said baling chamber toward said feed opening substantially normal to the plane thereof and disposed to receive material moving backwardly from said pickup drum, to change its direction and impel it crosswise of said direction toward said opening, supporting means pivoted adjacent to an upper edge of said baling chamber and extending outwardly therefrom, a drum element positioned above said apron and carried by said supporting means outwardly of the pivotal support of said supporting means, as related to said baling chamber for preliminarily compressing material carried by said apron between itself and said apron so as to tend to climb on said material when rotated, and means for rotating said drum element for urging material toward said feed opening concurrently with said apron.

6. In a feeding device for a pickup baler having a longitudinally disposed baling chamber providing a feed opening in one side thereof and a pickup drum rotatable on an axis transverse to the length of said baling chamber; the combination of an endless, friction surfaced apron leading transversely of said baling chamber toward said feed opening substantially normal to the plane thereof and disposed to receive material moving backwardly from said pickup drum, to change its direction and impel it crosswise of said direction toward said opening, supporting means pivoted adjacent to an upper edge of said baling chamber and extending outwardly therefrom, a drum element positioned above said apron and carried by said supporting means outwardly of the pivotal support of said supporting means, as related to said baling chamber for preliminarily compressing material carried by said apron between itself and said apron so as to tend to climb on said material when rotated, and means for rotating said drum element for urging material toward said feed opening concurrently with said apron, said drum element being supported above said apron so as to float on material traveling thereon, and having a plurality of low cleats providing a slightly roughened surface engaging material to be impelled on said apron.

STANLEY D. RUSSELL.

References Cited in the file of this patent

UNITED STATES PATENTS

| Number | Name | Date |
| --- | --- | --- |
| 552,519 | Ellis | Jan. 7, 1896 |
| 965,486 | Putt | July 26, 1910 |
| 1,195,479 | Klop | Aug. 22, 1916 |
| 1,353,074 | Sgritta | Sept. 14, 1920 |
| 2,038,809 | Tallman et al. | Apr. 28, 1936 |
| 2,057,191 | Huffine | Oct. 13, 1936 |
| 2,084,447 | Matejcik | June 22, 1937 |
| 2,179,937 | Lamp | Nov. 14, 1939 |
| 2,180,852 | Russell | Nov. 21, 1939 |
| 2,205,278 | Russell | June 18, 1940 |
| 2,248,519 | Thompson, Jr. | July 8, 1941 |
| 2,293,679 | Barker | Aug. 18, 1942 |
| 2,337,739 | Crumb et al. | Dec. 28, 1943 |